US010413935B2

(12) United States Patent
Thompson et al.

(10) Patent No.: US 10,413,935 B2
(45) Date of Patent: Sep. 17, 2019

(54) FREE-RADICAL POLYMERIZATION METHODS AND ARTICLES THEREBY

(71) Applicant: 3M INNOVATIVE PROPERTIES COMPANY, St. Paul, MN (US)

(72) Inventors: Zachary J. Thompson, Woodbury, MN (US); Yoshihiko Tasaka, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 241 days.

(21) Appl. No.: 15/509,351

(22) PCT Filed: Sep. 14, 2015

(86) PCT No.: PCT/US2015/049962
§ 371 (c)(1),
(2) Date: Mar. 7, 2017

(87) PCT Pub. No.: WO2016/044151

PCT Pub. Date: Mar. 24, 2016

(65) Prior Publication Data

US 2017/0246660 A1  Aug. 31, 2017

Related U.S. Application Data

(60) Provisional application No. 62/051,486, filed on Sep. 17, 2014, provisional application No. 62/051,076, filed on Sep. 16, 2014.

(51) Int. Cl.
| | |
|---|---|
| *C08F 4/00* | (2006.01) |
| *B05D 7/14* | (2006.01) |
| *C08F 4/10* | (2006.01) |
| *C08F 4/26* | (2006.01) |
| *C08F 220/28* | (2006.01) |
| *C08L 33/06* | (2006.01) |
| *C08F 220/20* | (2006.01) |
| *C08K 3/22* | (2006.01) |
| *C08K 5/14* | (2006.01) |
| *C08K 5/3477* | (2006.01) |
| *C09D 133/14* | (2006.01) |
| *C08F 220/54* | (2006.01) |
| *C08F 220/18* | (2006.01) |
| *C08F 220/34* | (2006.01) |
| *C08F 222/10* | (2006.01) |

(52) U.S. Cl.
CPC ............. *B05D 7/14* (2013.01); *C08F 4/00* (2013.01); *C08F 4/10* (2013.01); *C08F 4/26* (2013.01); *C08F 220/20* (2013.01); *C08F 220/28* (2013.01); *C08K 3/22* (2013.01); *C08K 5/14* (2013.01); *C08K 5/3477* (2013.01); *C08L 33/06* (2013.01); *C09D 133/14* (2013.01); *C08F 220/18* (2013.01); *C08F 220/54* (2013.01); *C08F 222/1006* (2013.01); *C08F 2220/1883* (2013.01); *C08F 2220/343* (2013.01); *C08F 2222/1013* (2013.01); *C08K 2003/2248* (2013.01)

(58) Field of Classification Search
None
See application file for complete search history.

(56) References Cited

U.S. PATENT DOCUMENTS

| | | | |
|---|---|---|---|
| 3,347,954 A | 10/1967 | Bredereck | |
| 4,032,594 A | 6/1977 | Serratore | |
| 4,356,296 A | 10/1982 | Griffith | |
| 4,473,671 A | 9/1984 | Green | |
| 4,539,048 A | 9/1985 | Cohen | |
| 4,642,126 A | 2/1987 | Zador | |
| 4,648,843 A | 3/1987 | Mitra | |
| 4,652,274 A | 3/1987 | Boettcher | |
| 4,665,217 A | 5/1987 | Reiners | |
| 4,752,338 A | 6/1988 | Reiners | |
| 4,755,251 A | 7/1988 | Cline et al. | |
| 5,026,902 A | 6/1991 | Fock | |
| 5,076,844 A | 12/1991 | Fock | |
| 5,252,629 A | 10/1993 | Imai | |
| 5,290,172 A | 3/1994 | Sakuma et al. | |
| 6,355,704 B1 * | 3/2002 | Nakatsuka | A61K 6/0023 522/112 |

(Continued)

FOREIGN PATENT DOCUMENTS

| | | |
|---|---|---|
| EP | 201031 B1 | 4/1986 |
| EP | 201778 B1 | 4/1986 |

(Continued)

OTHER PUBLICATIONS

3M Surface Preparation for 3M™ VHB™ Tape Applications, Technical Bulletin, Dec. 2012, 4 pages.
3M™ Primer 94 (Ampoules), Safety Data Sheet, Apr. 15, 2014, pp. 1-18.
3M™ Silane Glass Treatment AP115, Safety Data Sheet, Jun. 16, 2014, pp. 1-10.
Bredereck, "Autoxidation CH-Active Polymerization Initiators: XIVth Report Polymerizations and Polymerization Inhibitors", Macromolecular Chemistry, 1966, vol. 99, pp. 96-102.
Bredereck, "Regarding CH-active polymerization initiators", Die Makromolekulare Chemie, 1966, vol. 92, pp. 70-90.

(Continued)

*Primary Examiner* — Robert S Loewe
(74) *Attorney, Agent, or Firm* — Bradford B. Wright

(57) ABSTRACT

A method of curing a curable composition includes: providing the curable composition; providing a substrate having a primer disposed on at least a portion thereof, wherein the primer comprises at least one immobilized polyvalent metal compound for free-radically curing the curable composition; and contacting the curable composition with the primer, thereby causing at least partial curing of the curable composition. The curable composition includes at least one free-radically polymerizable compound and a beta-dicarbonyl compound. The method can be used for adhesive bonding of substrates and preparation of various articles.

17 Claims, 1 Drawing Sheet

(56) References Cited

U.S. PATENT DOCUMENTS

| | | | |
|---|---|---|---|
| 6,552,140 B1 | 4/2003 | Kneafsey | |
| 6,583,197 B1 * | 6/2003 | Wada | A61K 6/0023 |
| | | | 522/182 |
| 6,852,775 B1 | 2/2005 | Soglowek | |
| 2003/0215635 A1 | 11/2003 | Johnson | |
| 2009/0048366 A1 * | 2/2009 | Torii | A61K 6/0023 |
| | | | 523/116 |
| 2009/0192239 A1 | 7/2009 | Hecht | |
| 2010/0010115 A1 * | 1/2010 | Kohro | A61K 6/083 |
| | | | 523/116 |
| 2011/0313078 A1 | 12/2011 | Vogt | |
| 2014/0113070 A1 | 4/2014 | Schumann | |

FOREIGN PATENT DOCUMENTS

| | | |
|---|---|---|
| EP | 373384 B1 | 10/1992 |
| EP | 0 618 246 A2 | 10/1994 |
| EP | 1 788 059 A1 | 5/2007 |
| GB | 1293209 | 10/1972 |
| GB | 1417088 | 12/1975 |
| GB | 2256875 | 12/1992 |
| GB | 2261223 | 12/1993 |
| JP | 2005-255654 | 9/2005 |
| TW | 201248219 | 12/2012 |
| WO | 2000-038619 | 7/2000 |
| WO | 2000-042092 | 7/2000 |
| WO | 2001-007444 | 2/2001 |
| WO | 2001-092271 | 12/2001 |
| WO | 2002-077043 | 10/2002 |
| WO | 2013-126377 | 8/2013 |
| WO | 2014-151650 | 9/2014 |
| WO | 2016-014218 | 1/2016 |

OTHER PUBLICATIONS

Rosen, "Single-Electron Transfer and Single-Electron Transfer Degenerative ChainTransfer Living Radical Polymerization", Chem. Rev., 2009, vol. 109, pp. 5069-5119.

International Search report on PCT international Application No. PCT/US2015/049962 dated Nov. 18, 2015, 5 pages.

Supplementary European Search Report, EP16854231.4, dated May 19, 2013, 3 pages.

* cited by examiner

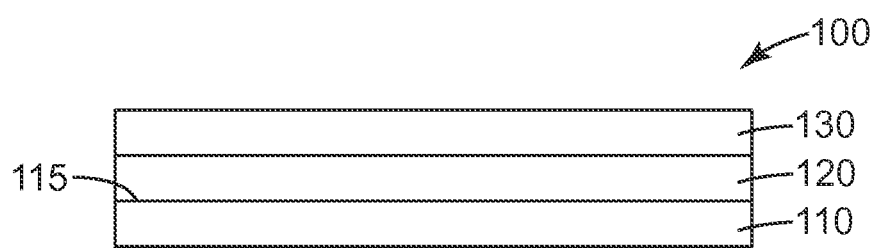

FREE-RADICAL POLYMERIZATION METHODS AND ARTICLES THEREBY

TECHNICAL FIELD

The present disclosure relates broadly to free-radical polymerization and free-radically polymerizable curable compositions.

BACKGROUND

Many vinyl compounds are polymerizable by free-radicals. Examples include acrylates and methacrylates, acrylamides and methacrylamides, allyl ethers, and styrenes.

Free-radical polymerization of vinyl compound(s) using certain beta-dicarbonyl (i.e., 1,3-dicarbonyl) compounds in the presence of a peroxide and/or molecular oxygen, a halide salt, and a copper compound such as copper acetylacetonate, has been described in U.S. Pat. No. 3,347,954 (Bredereck et al.). Such compositions cause free-radical polymerization of the vinyl compound(s) over time, with shorter times generally being preferred. Since the compositions are spontaneously reactive, it is common practice to provide them as a two-part system such as, for example, a part A and a part B that are combined immediately prior to use.

Organocopper compounds such as copper acetylacetonate may contain copper in a +1 or +2 oxidation state, and typically have good solubility in many organic systems. However, a typical problem of including such copper compounds in curable compositions is that they are prone to color formation, and may not be suitable for use in applications where absence of color is desirable for aesthetic and/or functional reasons.

Air-activated initiator systems are useful for polymerizing acrylic monomers in applications where oxygen-inhibition of the polymerization reaction is a concern. Two-part acrylic structural adhesives and liquid optically clear adhesives (LOCA) present specific examples where oxygen inhibition produces an undesirable tacky surface.

It would be desirable to have new methods for curing air-activated free-radically polymerizable systems such as, for example, those described above, especially if they provide extended shelf life prior to curing on a substrate.

SUMMARY

The present disclosure overcomes the above problem by immobilizing a polyvalent metal compound in a primer layer on a substrate to which the curable composition is to be bonded. When the components of the curable composition contact th polyvalent metal compound initiation of free-radical polymerization occurs, thereby at least partially curing the curable composition. Typically, the polyvalent metal compound is present at the primer layer but not in the curable composition, however minor amounts of the polyvalent metal compound may be included as long as they do not substantially shorten the desired shelf life or adversely affect the aesthetics or adhesion of the curable composition.

In a first aspect, the present disclosure provides a method of curing a curable composition, the method comprising:
a) providing the curable composition, wherein the curable composition comprises:
at least one free-radically polymerizable compound; and
a beta-dicarbonyl compound represented by the formula

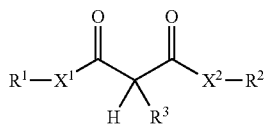

or a salt thereof, wherein:
$X^1$ and $X^2$ independently represent a covalent bond, O, S,

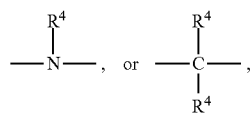

wherein each $R^4$ independently represents H or alkyl having from 1 to 18 carbon atoms,
$R^1$ and $R^2$ independently represent a hydrocarbyl or substituted-hydrocarbyl group having from 1 to 18 carbon atoms,
$R^3$ represents hydrogen, or a hydrocarbyl or substituted-hydrocarbyl group having from 1 to 18 carbon atoms,
or taken together any two of $R^1$, $R^2$, or $R^3$ form a five-membered or six-membered ring; and
b) providing a substrate having a primer layer disposed on at least a portion thereof, wherein the primer layer comprises at least one polyvalent metal compound for free-radically curing the curable composition immobilized in a binder material;
c) contacting the curable composition with at least a portion of the primer layer, thereby causing at least partial curing of the curable composition.

In a second aspect, the present disclosure provides an article comprising:
a first substrate having a surface having a primer layer disposed on at least a portion thereof, wherein the primer layer comprises at least one polyvalent metal compound for free-radically curing a curable composition, and wherein the at least one polyvalent metal compound is immobilized in a binder material;
a polymerized reaction product of the at least one polyvalent metal compound and the curable composition, wherein the curable composition comprises:
a) at least one free-radically polymerizable compound; and
b) a beta-dicarbonyl compound represented by the formula

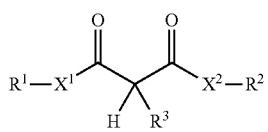

or a salt thereof, wherein:
$X^1$ and $X^2$ independently represent a covalent bond, O, S,

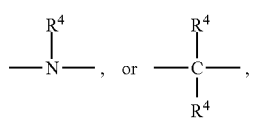

wherein each $R^4$ independently represents H or alkyl having from 1 to 18 carbon atoms, $R^1$ and $R^2$ independently represent a hydrocarbyl or substituted-hydrocarbyl group having from 1 to 18 carbon atoms, $R^3$ represents hydrogen, or a hydrocarbyl or substituted-hydrocarbyl group having from 1 to 18 carbon atoms, or taken together any two of $R^1$, $R^2$, or $R^3$ form a five-membered or six-membered ring.

Advantageously, the present inventors have found that addition of a small amount of a polyvalent metal salt into the primer layer improves adhesive bond performance nearly to the same level of dispersing the copper within the curable adhesive composition prior to cure, while providing enhanced shelf-life. The primer coatings had minimal effect on adhesive bond performance and omitting the copper altogether resulted in nearly-uncured adhesives with poor bond strength. Copper-containing primers present an alternative solution for bonding materials where utilizing a copper-containing adhesive is undesirable or not feasible.

As used herein, the term "immobilized polyvalent metal compound" means that the metal compound is incorporated into a solid composition (e.g., a polymeric binder material), and not present as part of a fluid primer composition.

As used herein, the prefix "(meth)acryl" refers to acryl and/or methacryl. For example, (meth)acrylate refers to acrylate and/or methacrylate.

As used herein, the term "hydrocarbyl" refers to a monovalent group derived from a hydrocarbon. Examples include methyl, phenyl, and methylcyclohexyl.

As used herein, the term "hydrocarbylene" refers to a divalent group derived from a hydrocarbon. Examples include methylene, phenylene, and 1,3-propane-diyl.

Features and advantages of the present disclosure will be further understood upon consideration of the detailed description as well as the appended claims.

BRIEF DESCRIPTION OF THE DRAWINGS

FIG. 1 is a schematic side view of an article 100 according to the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

The present disclosure concerns methods for curing free-radically polymerizable compositions using a polyvalent metal compound-based initiator system. Curing is effected by free-radical polymerization once the polyvalent metal compound is brought into contact with the curable composition.

The curable composition comprises at least one free-radically polymerizable compound, which may comprise at least one of (meth)acrylates, (meth)acrylamides, other vinyl compounds, and combinations thereof. Useful free-radically polymerizable compounds may comprise an ethylenically-unsaturated compound having one or more (e.g., one, two, three, four, or more) free-radically polymerizable groups.

Examples of suitable (meth)acrylates include mono-, di-, and poly-(meth)acrylates and (meth)acrylamides such as, for example, 1,2,4-butanetriol tri(meth)acrylate, 1,3-butylene glycol di(meth)acrylate, 1,3-propanediol di(meth)acrylate, 1,4-butanediol di(meth)acrylate, 1,4-cyclohexanediol di(meth)acrylate, 1,6-hexanediol di(meth)acrylate, 1,6-hexanediol monomethacrylate monoacrylate, 2-phonexy-ethyl (meth)acrylate, alkoxylated cyclohexanedimethanol di(meth)acrylates, alkoxylated hexanediol di(meth)acrylate, alkoxylated neopentyl glycol di(meth)acrylate, allyl (meth)acrylate, bis[1-(2-(meth)acryloxy)]-p-ethoxyphenyldimethylmethane, bis[1-(3-(meth)acryloxy-2-hydroxy)]-p-propoxyphenyldimethylmethane, caprolactone modified dipentaerythritol hexa(meth)acrylate, caprolactone modified neopentyl glycol hydroxypivalate di(meth)acrylate, cyclohexanedimethanol di(meth)acrylate, diethylene glycol di(meth)acrylate, dipentaerythritol penta(meth)acrylate, dipropylene glycol di(meth)acrylate, ditrimethylolpropane tetra(meth)acrylate, ethoxylated (10) bisphenol A di(meth)acrylate, ethoxylated (20) trimethylolpropane tri(meth)acrylate, ethoxylated (3) bisphenol A di(meth)acrylate, ethoxylated (3) trimethylolpropane tri(meth)acrylate, ethoxylated (30) bisphenol A di(meth)acrylate, ethoxylated (4) bisphenol A di(meth)acrylate, ethoxylated (4) pentaerythritol tetra (meth)acrylate, ethoxylated (6) trimethylolpropane tri(meth)acrylate, ethoxylated (9) trimethylolpropane tri(meth)acrylate, ethoxylated bisphenol A di(meth)acrylate, ethyl (meth)acrylate, ethylene glycol di(meth)acrylate, 2-ethylhexyl (meth)acrylate, glycerol tri(meth)acrylate, hydroxypivalaldehyde modified trimethylolpropane di(meth)acrylate, octyl (meth)acrylate, nonyl (meth)acrylate, decyl (meth)acrylate, lauryl (meth)acrylate, tridecyl (meth)acrylate, isobornyl (meth)acrylate, isopropyl (meth)acrylate, methyl (meth)acrylate, neopentyl glycol di(meth)acrylate, n-hexyl (meth)acrylate, pentaerythritol tetra(meth)acrylate, pentaerythritol tri(meth)acrylate, polyethylene glycol (200) di(meth)acrylate, polyethylene glycol (400) di(meth)acrylate, polyethylene glycol (600) di(meth)acrylate, propoxylated (3) glyceryl tri(meth)acrylate, propoxylated (3) trimethylolpropane tri (meth)acrylate, propoxylated (5.5) glyceryl tri(meth)acrylate, propoxylated (6) trimethylolpropane tri(meth)acrylate), propoxylated neopentyl glycol di(meth)acrylate, sorbitol hexa(meth)acrylate, stearyl (meth)acrylate, tetraethylene glycol di(meth)acrylate, tetrahydrofurfuryl (meth)acrylate, tricyclodecanedimethanol di(meth)acrylate, triethylene glycol di(meth)acrylate, trimethylolpropane tri(meth)acrylate, tripropylene glycol di(meth)acrylate, tris(2-hydroxyethyl) isocyanurate tri(meth)acrylate, (meth)acrylamide, N,N-dimethylacrylamide, N-vinylpyrrolidone, N-vinylcaprolactam, methylene bis(meth)acrylamide, diacetone (meth)acrylamide, (meth)acryloylmorpholine, urethane (meth)acrylates, polyester (meth)acrylates, epoxy (meth)acrylates, copolymerizable mixtures of (meth)acrylated monomers such as those in U.S. Pat. No. 4,652,274 (Boettcher et al.), (meth) acrylated oligomers such as those of U.S. Pat. No. 4,642,126 (Zador et al.), and poly(ethylenically-unsaturated) carbamoyl isocyanurates such as those disclosed in U.S. Pat. No. 4,648,843 (Mitra).

Examples of suitable free-radically polymerizable vinyl compounds include styrene, diallyl phthalate, divinyl succinate, divinyl adipate, and divinyl phthalate. Other suitable free-radically polymerizable compounds include siloxanefunctional (meth)acrylates as disclosed, for example, in PCT Published Application Nos. WO 00/38619 (Guggenberger et al.), WO 01/92271 (Weinmann et al.), WO 01/07444 (Guggenberger et al.), WO 00/42092 (Guggenberger et al.), and fluoropolymer-functional (meth)acrylates as disclosed, for example, in U.S. Pat. No. 5,076,844 (Fock et al.), U.S. Pat. No. 4,356,296 (Griffith et al.), EP 0 373 384 (Wagenknecht et al.), EP 0 201 031 (Reiners et al.), and EP 0 201 778 (Reiners et al.).

Suitable free-radically polymerizable compounds may contain hydroxyl groups and free-radically active functional groups in a single molecule. Examples of such materials include hydroxyalkyl (meth)acrylates such as 2-hydroxyethyl (meth)acrylate, 4-hydroxybutylate, poly(propylene glycol) (meth)acrylate, 2-hydroxypropyl (meth)acrylate, glycerol mono- or di-(meth)acrylate, trimethylolpropane mono- or di-(meth)acrylate, pentaerythritol mono-, di-, and tri-(meth)acrylate, sorbitol mono-, di-, tri-, tetra-, or penta-(meth)acrylate, and 2,2-bis[4-(2-hydroxy-3-methacryloxypropoxy)phenyl]propane (bisGMA).

Suitable free-radically polymerizable compounds are available from a wide variety of commercial sources such as, for example, Sartomer Co., Exton, Pa., or can be made by known methods.

Typically, the curable composition includes a sufficient quantity of free-radically polymerizable compound(s) to provide the desired setting or hardening rate and desired overall properties following curing/hardening. Mixtures of free-radically polymerizable compounds can be used if desired.

The curable composition comprises a beta-dicarbonyl compound represented by the formula

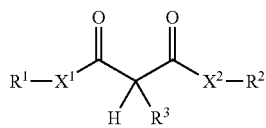

or a salt thereof.

$R^1$ and $R^2$ may independently represent a hydrocarbyl group, or a substituted-hydrocarbyl group, having from 1 to 18 carbon atoms. Preferably, $R^1$ and $R^2$ each have from 1 to 12 carbon atoms, more preferably 1 to 8 carbon atoms, and even more preferably 1 to 4 carbon atoms. Exemplary groups $R^1$ and $R^2$ include methyl, ethyl, isopropyl, n-propyl, butyl, pentyl, hexyl, octyl, decyl, dodecyl, hexadecyl, and octadecyl. Generally, the nature of the substituents in the substituted-hydrocarbyl groups (which may be mono-substituted or poly-substituted) is not particularly important, except that substituents that interfere with the free-radical polymerization should be used sparingly or excluded altogether. Exemplary substituted-hydrocarbyl groups include hydroxyhydrocarbyl groups (e.g., hydroxyethyl and hydroxypropyl), alkoxyhydrocarbyl groups (e.g., methoxyethyl and methoxyethoxy), alkanoylhydrocarbyl groups (e.g., acetylethyl and benzoylethyl), haloalkyl groups (e.g., chloroethyl and dichloropropyl), and dialkylaminohydrocarbyl groups (e.g., dimethylaminopropyl and diethylaminoethyl).

In some embodiments, any two of $R^1$, $R^2$, and $R^3$ taken together form a five-membered or six-membered ring. In those embodiments, two of $R^1$, $R^2$ and $R^3$ taken together may represent, for example: a divalent group selected from

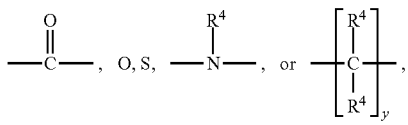

and combinations thereof, wherein each $R^4$ independently represents H or an alkyl group having from 1 to 18 carbon atoms (preferably an alkyl group having from 1 to 12 carbon atoms, more preferably from 1 to 8 carbon atoms, and more preferably from 1 to 4 carbon atoms), and y is 1, 2, or 3. For example, the beta-dicarbonyl compound may be 2,2-dimethyl-1,3-dioxane-4,6-dione (Meldrum's acid). Exemplary groups $R^4$ include hydrogen, methyl, ethyl, isopropyl, n-propyl, butyl, pentyl, hexyl, octyl, decyl, dodecyl, hexadecyl, and octadecyl. Examples of divalent groups formed by two of $R^1$, $R^2$ and $R^3$ taken together include alkylene, alkyleneoxy, oxycarbonyloxy, carbonylalkylene, alkylenecarbonyloxy, alkyleneoxycarbonyl, alkylene(alkyl)amino, and dialkylene(alkyl)amino. If $R^1$ and $R^2$ taken together form a 5-membered ring, then at least one of $X^1$ or $X^2$ is a covalent bond.

$R^3$ may represent hydrogen or a hydrocarbyl group having from 1 to 18 carbon atoms. Exemplary groups $R^3$ include methyl, ethyl, isopropyl, n-propyl, butyl, pentyl, hexyl, octyl, decyl, dodecyl, hexadecyl, phenyl, cyclohexyl, methylcyclohexyl, and octadecyl. Exemplary substituted hydrocarbyl groups $R^3$ include —$CH_2C(=O)OR_4$ wherein $R_4$ is as previously defined (e.g., $R_4$ may be H, methyl, ethyl, dodecyl, or octadecyl).

Each of $X^1$ and $X^2$ independently represents a covalent bond, O, S,

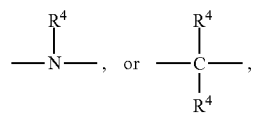

wherein $R^4$ is as described above.

In some embodiments, the beta-dicarbonyl compound comprises barbituric acid (i.e., $R^3$=H, both of $X^1$

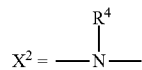

and wherein $R^4$=H, and taken together $R^1$ and $R^2$=carbonyl) or a derivative thereof (e.g., a 1,3-dialkylbarbituric acid). Examples of suitable barbituric acid derivatives include 1,3,5-trimethylbarbituric acid, 1,3,5-triethylbarbituric acid, 1,3-dimethyl-5-ethylbarbituric acid, 1,5-dimethylbarbituric acid, 1-methyl-5-ethylbarbituric acid, 1-methyl-5-propylbarbituric acid, 5-ethylbarbituric acid, 5-propylbarbituric acid, 5-butylbarbituric acid, 1-benzyl-5-phenylbarbituric acid, and 1-cyclohexyl-5-ethylbarbituric acid.

Useful salts of the beta-dicarbonyl compound may include alkali metal (e.g., lithium sodium, potassium, or cesium) salts, $NH_4^+$ salts, and primary, secondary, tertiary, and quaternary (i.e., 1°, 2°, 3°, and 4°) organoammonium salts, preferably having from 1 to 24 carbon atoms. Examples include tetrabutylammonium, dibenzyldimethylammonium, benzyltributylammonium, and tetraethylammonium salts.

The beta-dicarbonyl compound may be present in the curable composition in any amount, but preferably in an amount of from 0.1 to 20 percent by weight, preferably 1 to 10 percent, by weight although other amounts may also be used.

Optionally, but preferably, the curable composition may further comprise one or more organic peroxides (e.g., mono- or multi-functional carboxylic acid peroxyesters), which typically act to decrease the cure time of the curable composition. Commercially available organic peroxides include, for example, t-alkyl esters of peroxycarboxylic acids, t-alkyl esters of monoperoxydicarboxylic acids, di(t-alkyl) esters of diperoxydicarboxylic acids, alkylene diesters of peroxycarboxylic acids, dialkyl peroxydicarbonates, and OO-t-alkyl O-alkyl diesters of monoperoxycarbonic acid. Exemplary organic peroxides include diisopropyl peroxydicarbonate, t-butyl peroxyneodecanoate, t-amyl peroxyneodecanoate, maleic acid t-butyl monoperoxyester, t-butyl peroxybenzoate, t-butyl peroxy-2-ethylhexanoate, t-amyl peroxy-2-ethylhexanoate, O-isopropyl O,O-t-butyl monoperoxycarbonate, dicyclohexyl peroxycarbonate, dimyristyl peroxycarbonate, dicetyl peroxycarbonate, di(2-ethylhexyl) peroxycarbonate, O,O-t-butyl O-2-ethylhexyl peroxycarbonate, t-butyl peroxy-3,5,5-trimethylhexanoate, t-amyl peroxybenzoate, t-butyl peroxyacetate, di(4-t-butylcyclohexyl) peroxycarbonate, cumyl peroxyneodecanoate, t-amyl peroxypivalate, cumene hydroperoxide, and t-butyl peroxypivalate. Further suitable organic peroxides will be known to one of ordinary skill in the art.

If present, the optional organic peroxide may be present in the curable composition in any amount, but preferably in an amount of from 0.1 to 10 percent by weight, preferably 1 to 5 percent by weight, although other amounts may also be used. In some embodiments, the curable composition may contain little or no organic peroxide. For example the curable composition may be essentially free of (e.g., contain less than 1 percent by weight of, less than 0.1 percent by weight of, or even contain less than 0.01 percent by weight of) organic peroxide.

Optionally, but preferably, the curable composition further comprises a quaternary ammonium halide that is at least partially soluble in the curable composition. The quaternary ammonium halide may accelerate the free-radical polymerization rate. Suitable quaternary ammonium halides include those having four hydrocarbyl (e.g., alkyl, alkenyl, cycloalkyl, aralkyl, alkaryl, and/or aryl) groups. Preferably, the hydrocarbyl groups are independently selected from hydrocarbyl groups having from 1 to 18 carbon atoms, more preferably 1 to 12 carbon atoms, and more preferably 1 to 4 carbon atoms. Examples of suitable hydrocarbyl groups include methyl, ethyl, propyl, butyl, hexyl, octyl, dodecyl, hexadecyl, and octadecyl, benzyl, phenyl, tolyl, cyclohexyl, and methylcyclohexyl. Exemplary suitable quaternary ammonium compounds include tetramethylammonium halides, tetraethylammonium halides, tetrapropylammonium halides, tetrabutylammonium halides, ethyltrimethylammonium halides, diethyldimethylammonium halides, trimethylbutylammonium halides, trioctylmethyl ammonium halides, and benzyltributylammonium halides. Any halide (e.g., F, Cl, Br, I) ion may be used in the quaternary ammonium halide, but preferably the halide ion is chloride or bromide.

If present, the quaternary ammonium salt may be present in the curable composition in any amount, but preferably in an amount of from 0.01 to 5 percent by weight, preferably 0.1 to 2 percent although other amounts may also be used.

Curable compositions according to the present disclosure may optionally include additives such, as for example, one or more fillers, antioxidants, plasticizers, tackifiers, photoinitiators, thickeners, fragrances, hindered amine light stabilizers (HALS), UV stabilizers, inhibitors (e.g., which may accompany free-radically polymerizable compounds), coating aids, thixatropes, coupling agents, toughening agents, or a combination thereof. Examples of fillers include silica, clays, and surface modified clays. Exemplary toughening agents include elastomeric materials such as various synthetic rubbers (e.g., methyl methacrylate-butadiene-styrene (MBS) copolymers, acrylonitrile-butadiene-styrene (ABS) copolymers, linear polyurethanes, acrylonitrile-butadiene rubbers, styrene-butadiene rubbers, chloroprene rubbers, butadiene rubbers, and natural rubbers. Among them, acrylonitrile-butadiene rubbers are particularly useful because of their typically good solubility in the curable composition. Tougheners may be used alone or in combination.

The curable composition is brought into contact with the polyvalent metal compound in the primer coating to cause at least partial curing (preferably substantially complete curing) of the curable composition. Optionally, heating of the curable composition while in contact with the polyvalent metal compound may be carried out, although this is typically not necessary.

Useful polyvalent metal compounds for curing the curable composition include those metal salts, complexes and/or chelates (preferably soluble in the curable composition) that are known for use in cure systems of the types disclosed herein. Examples include salts, chelates, and/or complexes of organic anions (e.g., conjugate bases of organic acids having from 1 to 18 carbon atoms) with polyvalent metals with such as copper (II) (e.g., copper (II) acetylacetonate, copper (II) naphthenate, copper (II) acetate, copper (II) (meth)acrylate, copper (II) salicylate, and complexes of copper with thiourea or ethylenediaminetetraacetic acid), cobalt (II) and cobalt (III)(e.g., cobalt (II) octoate, cobalt (II) succinate cobalt (II) naphthenate, cobalt (II) resinate, and cobalt (II) linoleate, dicarboxylic acid semiesters and compounds with chelate-like bound cobalt of the type of cobalt acetoacetic ester and cobalt (II) bis(acetylacetonate), cobalt (III) tris(acetylacetonate), and cobalt chelates of 2-acetylcyclopentanone and cyclopentanone-2-carboxylic acid methyl ester); iron (III) (e.g., iron (III) (meth)acrylate, iron (III) acetoacetonate), manganese (II) (e.g., manganese (II) bis(acetylacetonate)), manganese (III) (e.g., manganese (III) tris(acetylacetonate)), and cobalt (III) (e.g., cobalt (III) tris(acetylacetonate)). Further examples include chlorides, hydroxides, carbonates, bicarbonates, sulfates, nitrates, and acetates of copper (II) or copper (III), cobalt (II) and cobalt (III), iron (II) and iron (III), manganese (II) and manganese (III). Other heavy polyvalent metals may also be used, provided that they are capable of promoting curing of the curable composition.

The polyvalent metal compound may be added to the primer composition in any efficacious amount. Preferably, the amount of the polyvalent metal compound added to the primer lies in the range of 0.0005 to 0.5 percent by weight, preferably 0.0005 to 0.05 percent by weight for copper and cobalt compounds, and from 0.005 to 0.5 percent by weight for iron and manganese compounds.

Exemplary substrates useful in practicing the above embodiments may include: glass (e.g., as plates, sheets, windows), or electronic display windows (e.g., LCD display or plasma display); polarizers; flexible circuits; circuit boards; plumbing; plastic films, parts or sheets (e.g., acrylonitrile-butadiene-styrene (ABS) plastic, polymethyl methacrylate, polycarbonate, or polyester); metal (e.g., painted or unpainted); ceramic; silicon; and wood.

In one embodiment, at least a portion of a surface of a first substrate is coated with a primer composition comprising the polyvalent metal compound, an organic polymer or precursor thereof, and optional liquid vehicle. The primer composition may be prepared by mixing its component parts by conventional means, for example. Upon drying and/or curing the primer composition forms a primer layer containing a polymeric binder material on the first substrate. Examples of suitable liquid vehicles include volatile organic solvents (e.g., mineral spirits, alcohols, ketones, and esters), water, and combinations thereof. Coating methods such as those known in the art (e.g., brushing, wiping, and dip coating) are typically effective for applying the primer composition to the substrate, for example.

The primer composition may include at least one coupling agent (i.e., as an organic polymer precursor) and/or an organic polymer.

Useful coupling agents include silane coupling agents, titanate coupling agents, and zirconium-based coupling agents. These coupling agents are typically hydrolyzable (e.g., moisture curable) to form crosslinked compositions, typically organic polymers.

Examples of suitable silane coupling agents include epoxy-functional silane coupling agents such as, for example, 2-(3,4-epoxycyclohexyl)ethyltriethoxysilane, 2-(3,4-epoxycyclohexyl)ethyltrimethoxysilane, 5,6-epoxyhexyltriethoxysilane, (3-glycidoxypropyl)triethoxysilane, and (3-glycidoxypropyl)trimethoxysilane); mercapto-functional silane coupling agents such as, for example, 3-mercaptopropyltrimethoxysilane and 3-mercaptopropyltriethoxysilane; amine-functional silane coupling agents such as for example, N-methylaminopropyltrimethoxysilane, 4-aminobutyltriethoxysilane, N-(2-aminoethyl)-3-aminopropyltrimethoxysilane, (aminoethylaminomethyl)p-henethyltrimethoxysilane, N-(2-aminoethyl)-3-aminopropyltriethoxysilane. Silane coupling agents may be made, for example, by conventional techniques, or they may be purchased from commercial suppliers such as, for example, Gelest, Inc., Morrisville, Pa.; GE Plastics, Pittsfield, Mass.; and United Chemical Technologies, Inc., Horsham, Pa.

A second type of useful coupling agent comprises organotitanates. Usable titanate coupling agents are identified in U.S. Pat. No. 4,473,671 (Green). Specific examples of the above include: isopropyl triisostearoyl titanate, isopropyl tri(lauryl-myristyl) titanate, isopropyl isostearoyl dimethacryl titanate; isopropyl tri(dodecyl-benzenesulfonyl) titanate, isopropyl isostearoyl diacryl titanate, isopropyl tri(diisooctylphosphato) tri(dioctylpyrophosphato) titanate; and isopropyl triacryloyl titanate. Organotitanates may be made, for example, by conventional techniques, or they may be purchased from commercial suppliers such as, E.I. du Pont de Nemours and Co., Wilmington, Del., e.g., under the trade designation "Tyzor" (e.g., as TYZOR LA and TYZOR 131 organic titanates).

A third class of coupling agent useable according to the present invention comprises zirconium based coupling agents such as, for example, zircoaluminates as described in U.S. Pat. No. 4,539,048 (Cohen).

Upon drying of the primer composition these coupling agents may self-condense to form a polymer.

Alternatively or in addition, the primer composition may include an organic polymer that forms a binder upon drying. Suitable polymers are preferably film forming, and may include polyesters, acrylic polymers, polycarbonates, polyacetals, polyvinyl chloride, and polyurethanes, for example.

The amounts of each ingredient in the primer composition/primer layer are not limited and will typically be readily determinable based on the desired properties. After evaporation of the liquid vehicle, the residual primer coating includes the polyvalent metal compound and an organic polymer which may be crosslinked or non-crosslinked. In this state the polyvalent metal compound is immobilized and can be stored for long periods of time, typically without adverse affect. In some embodiments, the curable composition is coated onto a surface of second substrate, and the two substrates are brought together so as to sandwich the curable composition between the primer layer and the surface of the second substrate, thereby causing curing of the curable composition and bonding the two substrates together, as shown in FIG. 1. In other embodiments, the curable composition is applied to the residual primer layer and then optionally second substrate placed on the curable composition.

Referring now to FIG. 1, article 100 comprises first substrate 110 having primer layer 115 and optional second substrate 130. Layer 120 comprising a reaction product of the curable composition and the immobilized polyvalent metal compound is disposed on surface 115. Layer 120 is disposed between first substrate 110 and second substrate 130.

SELECT EMBODIMENTS OF THE PRESENT DISCLOSURE

In a first embodiment, the present disclosure provides a method of curing a curable composition, the method comprising:
a) providing the curable composition, wherein the curable composition comprises:
at least one free-radically polymerizable compound; and
a beta-dicarbonyl compound represented by the formula

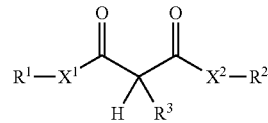

or a salt thereof, wherein:
$X^1$ and $X^2$ independently represent a covalent bond, O, S,

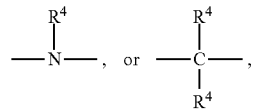

wherein each $R^4$ independently represents H or alkyl having from 1 to 18 carbon atoms,
$R^1$ and $R^2$ independently represent a hydrocarbyl or substituted-hydrocarbyl group having from 1 to 18 carbon atoms,
$R^3$ represents hydrogen, or a hydrocarbyl or substituted-hydrocarbyl group having from 1 to 18 carbon atoms, or taken together any two of $R^1$, $R^2$, or $R^3$ form a five-membered or six-membered ring; and
b) providing a substrate having a primer layer disposed on at least a portion thereof, wherein the primer layer comprises at least one polyvalent metal compound for free-radically curing the curable composition immobilized in a binder material;
c) contacting the curable composition with at least a portion of the primer layer, thereby causing at least partial curing of the curable composition.

In a second embodiment, the present disclosure provides a method according to the first embodiment, wherein the curable composition is essentially free of organic peroxide.

In a third embodiment, the present disclosure provides a method according to the first embodiment, wherein the curable composition further comprises an organic peroxide.

In a fourth embodiment, the present disclosure provides a method according to any one of the first to third embodiments, wherein the curable composition further comprises a quaternary ammonium halide.

In a fifth embodiment, the present disclosure provides a method according to any one of the first to fourth embodiments, wherein the beta-dicarbonyl compound comprises 1,3-dialkylbarbituric acid or a derivative thereof.

In a sixth embodiment, the present disclosure provides a method according to any one of the first to fifth embodiments, wherein the at least one polyvalent metal compound comprises at least one of copper (II), iron (II), iron (III), cobalt (II), cobalt (III), manganese (II), and manganese (III).

In a seventh embodiment, the present disclosure provides a method according to any one of the first to sixth embodiments, wherein the at least one free-radically polymerizable compound comprises a free-radically polymerizable polyfunctional (meth)acrylate.

In an eighth embodiment, the present disclosure provides a method according to any one of the first to seventh embodiments, wherein the primer layer comprises an organic polymer.

In a ninth embodiment, the present disclosure provides a method according to any one of the first to eighth embodiments, wherein the substrate comprises a polarizer.

In a tenth embodiment, the present disclosure provides an article comprising:
a first substrate having a surface having a primer layer disposed on at least a portion thereof, wherein the primer layer comprises at least one polyvalent metal compound for free-radically curing a curable composition, and wherein the at least one polyvalent metal compound is immobilized in a binder material;
a polymerized reaction product of the at least one polyvalent metal compound and a curable composition, wherein the curable composition comprises:
a) at least one free-radically polymerizable compound; and
b) a beta-dicarbonyl compound represented by the formula

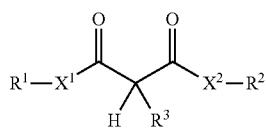

or a salt thereof, wherein:
$X^1$ and $X^2$ independently represent a covalent bond, O, S,

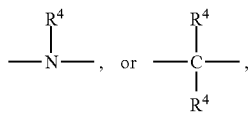

wherein each $R^4$ independently represents H or alkyl having from 1 to 18 carbon atoms,
$R^1$ and $R^2$ independently represent a hydrocarbyl or substituted-hydrocarbyl group having from 1 to 18 carbon atoms,
$R^3$ represents hydrogen, or a hydrocarbyl or substituted-hydrocarbyl group having from 1 to 18 carbon atoms,
or taken together any two of $R^1$, $R^2$, or $R^3$ form a five-membered or six-membered ring.

In an eleventh embodiment, the present disclosure provides an article according to the tenth embodiment, wherein the reaction product contacts a second substrate, and wherein the reaction product is at least partially disposed between the first substrate and the second substrate.

In a twelfth embodiment, the present disclosure provides an article according to the eleventh embodiment, wherein the second substrate comprises glass. In a thirteenth embodiment, the present disclosure provides an article according to any one of the tenth to twelfth embodiments, wherein the first substrate further comprises glass.

In a fourteenth embodiment, the present disclosure provides an article according to any one of the eleventh to thirteenth embodiments, wherein the second substrate comprises a polarizer.

In a fifteenth embodiment, the present disclosure provides an article according to any one of the tenth to fourteenth embodiments, wherein the curable composition is essentially free of organic peroxide.

In a sixteenth embodiment, the present disclosure provides an article according to any one of the tenth to fourteenth embodiments, wherein the curable composition further comprises an organic peroxide.

In a seventeenth embodiment, the present disclosure provides an article according to any one of the tenth to sixteenth embodiments, wherein the curable composition further comprises a quaternary ammonium halide.

In an eighteenth embodiment, the present disclosure provides an article according to any one of the tenth to seventeenth embodiments, wherein the beta-dicarbonyl compound comprises 1,3-dialkylbarbituric acid or a derivative thereof.

In a nineteenth embodiment, the present disclosure provides an article according to any one of the tenth to eighteenth embodiments, wherein the at least one polyvalent metal compound comprises at least one of copper (II), iron (II), iron (III), cobalt (II), cobalt (III), manganese (II), and manganese (III).

In a twentieth embodiment, the present disclosure provides an article according to any one of the tenth to nineteenth embodiments, wherein the at least one free-radically polymerizable compound comprises a free-radically polymerizable polyfunctional (meth)acrylate.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Table 1, below lists abbreviations and sources for materials used in the Examples.

TABLE 1

| COMPOUND | DESCRIPTION AND/OR SOURCE |
| --- | --- |
| HEMA | 2-hydroxyethyl methacrylate, an acrylate monomer, available from Alfa Aesar, Ward Hill, Massachusetts |
| THFMA | tetrahydrofurfuryl methacrylate, an acrylate monomer, available from Sartomer Co., Exton, Pennsylvania |
| SR541 | ethoxylated bisphenol-A dimethacrylate, a di-functional acrylate monomer, available from Sartomer Co. |
| SSM44 | urethane acrylate oligomer, available as Art Resin SSM44, obtained from Negami Chemical Industrial Co., Ltd., Ishikawa, Japan |
| LA | lauryl acrylate, an acrylate monomer, available from Osaka Organic Chemical Industry Ltd., Osaka, Japan |
| DMAA | N,N-dimethyl acrylamide, an acrylamide monomer, available as DMAA, obtained from KJ Chemicals Corporation, Tokyo, Japan |
| 1-benzyl-5-phenyl-barbituric acid | available from Aldrich Chemical Co., Milwaukee, Wisconsin |
| DAS | dimethyl acetyl succinate, available from Alfa Aesar, Ward Hill, Massachusetts |
| t-butyl 3,5,5-trimethyl-peroxyhexanoate | obtained from Acros Organics, Antwerp, Belgium |
| cumene hydroperoxide | obtained as Percumyl H-80 from NOF Corporation, Tokyo, Japan |
| TPO | diphenyl (2,4,6-trimethylbenzoyl)-phosphine oxide, available as LUCIRIN TPO, obtained from BASF, Florham Park, New Jersey |
| PLAS | BENZOFLEX 9-88 plasticizer obtained from Eastman Chemical Co., Kingsport, Tennessee |
| HFS | CAB-O-SIL TS-720 hydrophobic treated fumed silica obtained from Cabot Corp., Boston, Massachusetts |
| $NH_4Cl$ | benzyltributylammonium chloride, available from Aldrich Chemical Co., Milwaukee, Wisconsin |
| methyltrioctylammonium chloride | available from Aldrich Chemical Co., Milwaukee, Wisconsin |
| NBR | BAYMOD N 34.52 acrylonitrile-butadiene rubber obtained from Lanxess, Pittsburgh, Pennsylvania |
| AMSIL | WACKER HDK H18 pyrogenic amorphous silica, obtained from Wacker Chemie AG, Munich, Germany |
| KE311 | PINECRYSTAL KE-311 hydrogenated rosin ester, obtained from Arakawa Chemical Industries, Ltd., Osaka, Japan |
| DOA | bis(2-ethylhexyl) adipate, available from Aldrich Chemical Co., Milwaukee, Wisconsin |
| AOX | tri-nonylphenyl phosphate, obtained as ADEKASTAB 1178 from Adeka Corporation, Tokyo, Japan |
| BL-S | polyvinyl butyral resin, obtained as S-LEC BL-S from Sekisui Chemical Company Ltd., Osaka, Japan |
| EtOH | ethyl alcohol, available from Aldrich Chemical Co., Milwaukee, Wisconsin |
| BuOH | n-butyl alcohol, available from Aldrich Chemical Co., Milwaukee, Wisconsin |
| PRIM94 | TAPE PRIMER 94 polymer-containing solvent-based adhesive primer obtained from 3M Company, St. Paul, Minnesota |
| AP-115 | SILANE GLASS TREATMENT AP115 silane adhesive primer obtained from 3M Company, St. Paul, Minnesota, contains 3-(trimethoxysilyl)propyl glycidyl ether silane coupling agent |
| CuNaphth | copper (II) naphthenate, 77% in mineral spirits, obtained from Strem Chemicals, Inc., Newburyport, Massachusetts |

Preparation of Compositions A and B

Each of the following compositions was composed of a diluent, a thixotropic agent, an initiator molecule, and an organic peroxide. The components of the compositions were mixed in cups using a DAC 400 FVZ SPEEDMIXER from FlackTek Inc., Landrum, S.C., for 30 seconds at 2,000 revolutions per minute (rpm) and 30 seconds at 2,500 rpm. The cups were checked to ensure the initiator molecule and the thixotrope were fully dispersed. The formulations of Compositions A and B are reported in Table 2 below.

TABLE 2

| | COMPOSITION, weight percent of components | |
| --- | --- | --- |
| COMPONENT | A | B |
| PLAS | 84 | 84 |
| HFS | 2.5 | 0 |

TABLE 2-continued

| COMPONENT | COMPOSITION, weight percent of components | |
|---|---|---|
| | A | B |
| AMSIL | 0 | 2.5 |
| 1-benzyl-5-phenylbarbituric acid | 11 | 11 |
| t-butylperoxy-3,5,5-trimethylhexanoate | 2.5 | 2.5 |

Preparation of Compositions C and D

Each of the Compositions C-D contained at least one polymerizable methacrylate monomer and an ammonium halide salt. The ammonium halide salt was shaken in a vial until fully dissolved in the methacrylate monomer(s). The compositions were prepared using the amounts listed in Table 3 (below).

TABLE 3

| COMPONENT | COMPOSITION, parts by weight of components | |
|---|---|---|
| | C | D |
| THFMA | 93 | 0 |
| HEMA | 4.75 | 97.75 |
| NH$_4$Cl | 0.25 | 0.25 |

Preparation of Primer Compositions E-H

Each of the primer compositions E-H contained a commercially available liquid primer and, optionally, a copper salt. Liquid solutions of the copper salt were added to the liquid primer and shaken until the copper salt was fully dissolved or dispersed and the composition was a uniform color. The primer compositions were prepared using the amounts listed in Table 4 (below).

TABLE 4

| COMPONENT | PRIMER COMPOSITION, parts by weight of components | | | |
|---|---|---|---|---|
| | E | F | G | H |
| PRIM94 | 100 | 100 | 0 | 0 |
| AP-115 | 0 | 0 | 100 | 100 |
| CuNaphth | 0 | 0.001 | 0 | 0.001 |

Examples 1-4 and Comparative Examples A-F

For each of the following Examples and Comparative Examples, FISHER Plain 25×75×1.0 mm Microscope Slides were wiped with isopropanol and allowed to dry in air for 30 minutes. For Examples 1-4 and Comparative Examples A-D, the cleaned microscope slides were dip-coated into the specified primer compositions and allowed to dry in air for a further 30 minutes resulting in a dry (non-liquid) coating. Comparative Examples E and F do not contain a primer coating.

For each of the following Examples and Comparative Examples, Composition C or D (4 mL) and Composition A (0.4 mL) were mixed in a small vial. Three drops of the resultant curable composition were then placed on an aforementioned dip-coated glass slide and covered with a glass cover slip. Cure time for each example was established when the glass cover slip could be pushed by hand and not move across the substrate. The cure times are reported in Table 5 (below).

TABLE 5

| | PRIMER COMPOSITION | COPPER PRESENT | COMPOSITIONS USED | CURE TIME, MINUTES |
|---|---|---|---|---|
| EXAMPLE 1 | F | Yes | A, C | 10 |
| EXAMPLE 2 | H | Yes | A, C | 13 |
| EXAMPLE 3 | F | Yes | A, D | 2 |
| EXAMPLE 4 | H | Yes | A, D | 3 |
| COMPARATIVE EXAMPLE A | E | No | A, D | 30 |
| COMPARATIVE EXAMPLE B | G | No | A, C | 30 |
| COMPARATIVE EXAMPLE C | E | No | A, D | 5 |
| COMPARATIVE EXAMPLE D | G | No | A, D | 5 |
| COMPARATIVE EXAMPLE E | N/A | No | A, C | 30 |
| COMPARATIVE EXAMPLE F | N/A | No | A, C | 5 |

Preparation of Compositions I and J

Two acrylic structural adhesive resins, one containing a soluble copper salt and one without, were prepared and the details of Compositions I and J are listed in Table 6. A stock solution of 79.3 parts THMFA and 20.7 parts of NBR was prepared by dispersing the NBR into the THFMA in a jar, then rolling the jar overnight to obtain a clear solution. A stock solution of 20 percent by weight benzyltributylammonium chloride in HEMA was prepared by adding the halide salt to HEMA and shaking until dissolved. The components of Compositions I and J were then mixed in cups using a DAC 600.1 VAC-P SPEEDMIXER from FlackTek Inc., Landrum, S.C., for 4 minutes at 2500 rpm.

TABLE 6

| COMPONENT | COMPOSITION, parts by weight of components | |
|---|---|---|
| | I | J |
| THFMA/NBR stock solution | 76.9 | 76.9 |
| SR541 | 10.3 | 10.3 |
| HEMA/NH$_4$Cl Stock | 8.2 | 8.2 |
| AMSIL | 4.6 | 4.6 |
| CuNaphth | 0.001 | 0 |

Composition B and Composition I or J as indicated in Table 7 were loaded into the 10 part compartment of 10:1 (Composition I or J:Composition B) cartridges and dispensed through a static mixing nozzle. The resulting curable compositions were used to bond overlap shear samples on polycarbonate (PC), acrylonitrile-butadiene-styrene plastic (ABS), polymethyl methacrylate (PMMA), and polycarbonate/acrylonitrile-butadiene-styrene blend (PC/ABS) substrates. For each of the following Examples and Comparative Examples, the overlap shear substrates were wiped with isopropanol and allowed to dry in air for 30 minutes. For Examples 5-6 and Comparative Examples G-L, the cleaned overlap shear samples were dip-coated into the specified primer compositions and allowed to dry in air for a further 30 minutes resulting in a dry (non-liquid) coating. Comparative Examples M and N do not contain a primer coating. Overlap shear samples were 1.0 in×4.0 in×0.12 in (2.54 cm×10.2 cm×0.03 cm) rectangular coupons using 3-5 mil (76-127 micron) diameter spacer beads with a 0.5 in (1.27 cm) overlap. The bond line was held using binder clamps during cure. Testing was run on a load cell pulling at 2 inch/min (5.08 cm/min). The results for these tests are displayed in Table 7 (below).

TABLE 7

| COMPOSITIONS USED | COPPER IN COMPOSITION? | PRIMER COMPOSITION | COPPER IN PRIMER? | OVERLAP SHEAR STRENGTH, psi (MPa) | | | |
|---|---|---|---|---|---|---|---|
| | | | | Polycarbonate | ABS plastic | PMMA | Polycarbonate/ABS plastic |
| EXAMPLE 5 | B, J | No | F | Yes | 837 (5.77) | 753 (5.19) | 570 (3.93) | 785 (5.41) |
| EXAMPLE 6 | B, J | No | H | Yes | 710 (4.90) | 747 (5.15) | 559 (3.85) | 938 (6.47) |
| COMPARATIVE EXAMPLE G | B, I | Yes | E | No | 902 (6.22) | 727 (5.01) | 657 (4.53) | 920 (6.34) |
| COMPARATIVE EXAMPLE H | B, I | Yes | G | No | 812 (5.60) | 976 (6.73) | 823 (5.67) | 1023 (7.05) |
| COMPARATIVE EXAMPLE I | B, J | No | E | No | 171 (1.18) | 61 (0.42) | 247 (1.70) | 126 (0.87) |
| COMPARATIVE EXAMPLE J | B, J | No | G | No | 184 (1.27) | 92 (0.63) | 315 (2.17) | 191 (1.32) |
| COMPARATIVE EXAMPLE K | B, J | Yes | F | Yes | 865 (5.96) | 728 (5.02) | 656 (4.52) | 869 (5.99) |
| COMPARATIVE EXAMPLE L | B, I | Yes | H | Yes | 815 (5.62) | 690 (4.76) | 750 (5.17) | 870 (6.00) |
| COMPARATIVE EXAMPLE M | B, J | No | N/A | N/A | 175 (1.21) | 70 (0.48) | 161 (1.11) | 162 (1.12) |
| COMPARATIVE EXAMPLE N | B, I | Yes | N/A | N/A | 881 (6.07) | 780 (5.38) | 685 (4.72) | 925 (6.38) |

Preparation of Curable Composition K

Curable Composition K was prepared and the formulation is listed in Table 8 (below). All components of the composition, except cumene hydroperoxide, were mixed in glass bottle using a Planetary Centrifugal Mixer THINKY MIXER AR-250 from Thinky Corporation, Tokyo, Japan, for 15 minutes using mixing mode. The bottle was checked to ensure that the TPO was fully dissolved and the composition was homogeneous. After cooling to room temperature, cumene hydroperoxide was added and the composition was mixed for additional 2 minutes in mixing mode.

TABLE 8

| COMPONENT | CURABLE COMPOSITION, weight percent of components K |
|---|---|
| SSM44 | 62.5 |
| LA | 7.3 |
| DMAA | 5.2 |
| KE311 | 10.4 |
| DOA | 10.4 |
| DAS | 1.0 |
| cumene hydroperoxide | 1.0 |
| methyltrioctylammonium chloride | 0.3 |
| TPO | 1.0 |
| AOX | 1.0 |

Preparation of Composition L and M

Each of the primer compositions L and M were prepared by mixing the components in a glass bottle using a THINKY MIXER AR-250 for 10 minutes in mixing mode, until the compositions homogeneous and transparent. The compositions were prepared using the amounts listed in Table 9 (below).

TABLE 9

| COMPONENT | PRIMER COMPOSITION, parts by weight of components | |
|---|---|---|
| | L | M |
| EtOH | 75.0 | 75.0 |
| BuOH | 3.9 | 3.9 |

TABLE 9-continued

| COMPONENT | PRIMER COMPOSITION, parts by weight of components | |
|---|---|---|
| | L | M |
| BL-S | 13.2 | 13.2 |
| SSM44 | 7.9 | 7.9 |
| CuNaphth | 0.01 | 0 |

The cure performance of primer Compositions L and M were tested using a model image display construction. A polarizer (HLMC2-5610NHCRE, 0.125 mm thick, obtained from Sanritz Corporation, Toyama, Japan) was laminated to a 26×76×1.0 mm glass substrate, obtained as Pre-Cleaned Micro Slide Glass S1111 from Matsunami Glass Ind., Ltd., Osaka, Japan, using 3M Optically Clear Adhesive 8146-1. Primer Compositions L and M were applied to a second glass substrate using a brush and the primer was allowed to dry in air for 30 minutes resulting in a dry (non-liquid) coating. The dry coating weight was controlled to be approximately 0.0005 g/cm². Composition K (0.4 g) was placed onto the dried primer coating and was contacted with the polarizer face of the polarizer-laminated glass substrate. Polyethylene terephthalate spacer shims were used to maintain a constant thickness of 0.004 inch (0.1 mm) between the primed-glass substrate and the polarizer. Construction and evaluation of Example 7 and Counter Example O was conducted in a low-light environment to minimize UV exposure to the adhesive. The state of the adhesive was observed 30 and 60 minutes after bonding and the constructions were destroyed after 24 hours to determine the final state of cure of the adhesive. The results of these tests are shown in Table 10 (below).

TABLE 10

| | CURABLE COMPOSITION | PRIMER COMPOSITION | COPPER IN PRIMER? | STATE OF ADHESIVE | | |
|---|---|---|---|---|---|---|
| | | | | 30 Minutes | 60 Minutes | 24 Hours |
| EXAMPLE 7 | K | L | yes | liquid | elastic solid | solid |
| COMPARATIVE EXAMPLE O | K | M | no | liquid | liquid | liquid |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method of curing a curable composition, the method comprising:
   a) providing the curable composition, wherein the curable composition comprises:
      at least one free-radically polymerizable compound;
      a quaternary ammonium halide; and
      a beta-dicarbonyl compound represented by the formula

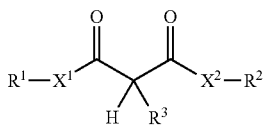

or a salt thereof, wherein:
   $X^1$ and $X^2$ independently represent a covalent bond, O, S,

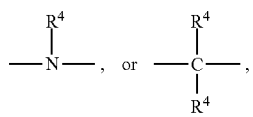

wherein each $R^4$ independently represents H or alkyl having from 1 to 18 carbon atoms,
   $R^1$ and $R^2$ independently represent a hydrocarbyl or substituted-hydrocarbyl group having from 1 to 18 carbon atoms,
   $R^3$ represents hydrogen, or a hydrocarbyl or substituted-hydrocarbyl group having from 1 to 18 carbon atoms,
   or taken together any two of $R^1$, $R^2$, or $R^3$ form a five-membered or six-membered ring; and
   b) providing a glass substrate having a primer layer disposed on at least a portion thereof, wherein the primer layer comprises at least one polyvalent metal compound for free-radically curing the curable composition immobilized in a binder material;
   c) contacting the curable composition with at least a portion of the primer layer, thereby causing at least partial curing of the curable composition.

2. The method of claim 1, wherein the curable composition is essentially free of organic peroxide.

3. The method of claim 1, wherein the curable composition further comprises an organic peroxide.

4. The method of claim 1, wherein the beta-dicarbonyl compound comprises 1,3-dialkylbarbituric acid or a derivative thereof.

5. The method of claim 1, wherein the at least one polyvalent metal compound comprises at least one of copper (II), iron (II), iron (III), cobalt (II), cobalt (III), manganese (II), and manganese (III).

6. The method of claim 1, wherein the at least one free-radically polymerizable compound comprises a free-radically polymerizable polyfunctional (meth)acrylate.

7. The method of claim 1, wherein the primer layer comprises an organic polymer.

8. The method of claim 1, wherein the substrate comprises a polarizer.

9. An article comprising:
   a glass substrate having a surface having a primer layer disposed on at least a portion thereof, wherein the primer layer comprises at least one polyvalent metal compound for free-radically curing a curable composition, and wherein the at least one polyvalent metal compound is immobilized in a binder material;
   a polymerized reaction product of the at least one polyvalent metal compound and the curable composition, wherein the curable composition comprises:
   a) at least one free-radically polymerizable compound;
   b) a beta-dicarbonyl compound represented by the formula

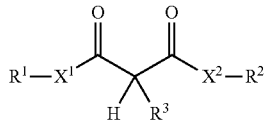

or a salt thereof, wherein:
   $X^1$ and $X^2$ independently represent a covalent bond, O, S,

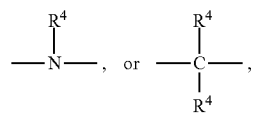

wherein each $R^4$ independently represents H or alkyl having from 1 to 18 carbon atoms,
   $R^1$ and $R^2$ independently represent a hydrocarbyl or substituted-hydrocarbyl group having from 1 to 18 carbon atoms, $R^3$ represents hydrogen, or a hydrocarbyl or substituted-hydrocarbyl group having from 1 to 18 carbon atoms, or taken together any two of $R^1$, $R^2$, or $R^3$ form a five-membered or six-membered ring; and c) a quaternary ammonium halide.

10. The article of claim 9, wherein the reaction product contacts a second substrate, and wherein the reaction product is at least partially disposed between the glass substrate and the second substrate.

11. The article of claim 10, wherein the second substrate comprises glass.

12. The article of claim 10, wherein the second substrate comprises a polarizer.

13. The article of claim 9, wherein the curable composition is essentially free of organic peroxide.

14. The article of claim 9, wherein the curable composition further comprises an organic peroxide.

15. The article of claim 9, wherein the beta-dicarbonyl compound comprises 1,3-dialkylbarbituric acid or a derivative thereof.

16. The article of claim 9, wherein the at least one polyvalent metal compound comprises at least one of copper (II), iron (II), iron (III), cobalt (II), cobalt (III), manganese (II), and manganese (III).

17. The article of claim 9, wherein the at least one free-radically polymerizable compound comprises a free-radically polymerizable polyfunctional (meth)acrylate.

* * * * *